United States Patent

[11] 3,614,064

[72] Inventor Winton J. Bennett
 1500 S. Dallas, Auburn, Ind. 46706
[21] Appl. No. 825,561
[22] Filed May 19, 1969
[45] Patented Oct. 19, 1971

[54] STABILIZING JACK STRUCTURE FOR MOBILE VEHICLE
 4 Claims, 6 Drawing Figs.
[52] U.S. Cl. .................................................. 254/86 R
[51] Int. Cl. ..................................................... B60s 9/02
[50] Field of Search ........................................ 254/86;
 248/352; 280/150.5

[56] References Cited
 UNITED STATES PATENTS
2,372,705 4/1945 Bicker .......................... 254/86
2,519,364 8/1950 Fredholm ..................... 254/86
2,976,055 3/1961 Harrison ....................... 280/150.5
3,425,714 2/1969 Morris .......................... 254/86
3,489,428 1/1970 Hunter ......................... 254/86 X Primary Examiner—Andrew R. Juhasz
Assistant Examiner—David R. Melton
Attorney—Jeffers and Rickert ABSTRACT: The invention pertains to a stabilizing jack structure for mobile vehicles and the like, in which two telescopically arranged members are interconnected by a lever-operated actuating mechanism which can be operated to vary the degree of telescopic engagement of said members. The upper end of said telescopic members is arranged for pivotal connection to the underside of a mobile vehicle, while the lower end of the members carries a ground-engaging member. The jack structure is swingable as a unit from a working position, wherein it extends vertically downwardly from the vehicle on which it is mounted up to a transport position wherein it is disposed parallel to and closely adjacent the bottom of the vehicle. The jack structure is arranged to be locked in each of its said positions on the vehicle.

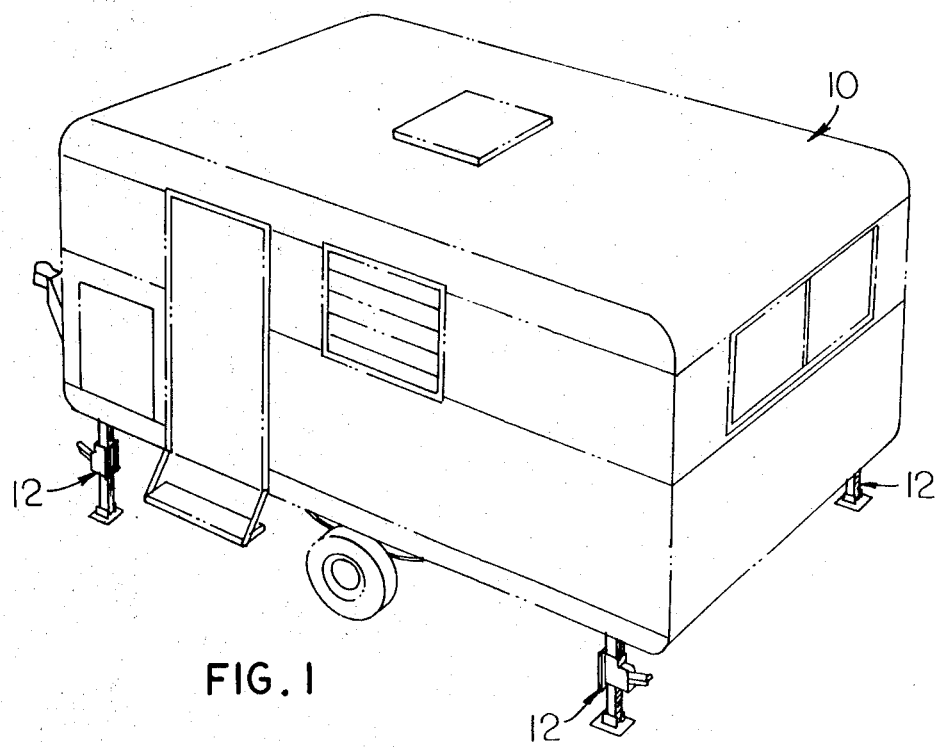
FIG. 1
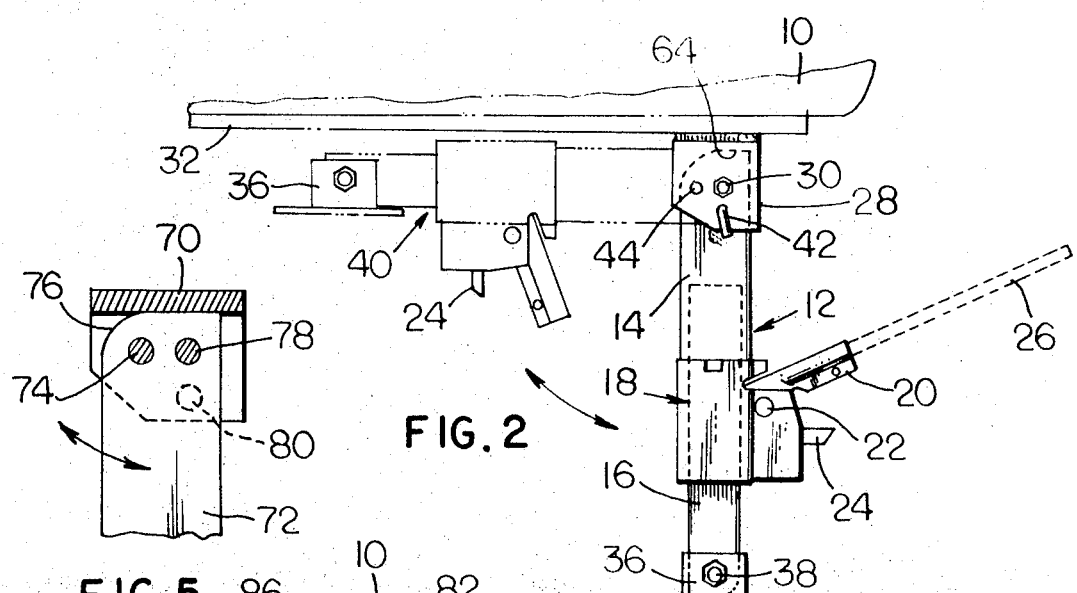
FIG. 2
FIG. 5
FIG. 6
INVENTOR
WINTON J. BENNETT
by JEFFERS & YOUNG
Attorneys

PATENTED OCT 19 1971 3,614,064

INVENTOR
WINTON J. BENNETT
by JEFFERS & YOUNG
Attorneys

STABILIZING JACK STRUCTURE FOR MOBILE VEHICLE

This invention relates to a jack arrangement for use with mobile-type vehicles, such as house trailers and campers for leveling and stabilizing the vehicle when parked.

Trailer-type vehicles and campers are in wide use and, since they are conveyed over road surfaces, are required to be sprung on the running gear thereof. When the trailers are parked, however, it is desired to eliminate the effect of the springs and to support the vehicle solidly on the surface therebeneath and also to support the vehicle so that the floor is horizontal. Blocks or jack devices at the sides or corners of the vehicle are ordinarily employed for this purpose and the present invention is concerned with a novel jack structure for this purpose.

SUMMARY OF THE INVENTION

The present invention proposes the provision of a lever-operated jack structure for use as a stabilizer jack for solidly supporting and stabilizing the vehicle with the floor thereof in a horizontal position when parked.

The jack structure proposed comprises a pair of telescopically arranged members with a lever-operated mechanism for supplying power for extending the members and for permitting the members to collapse. The mechanism referred to, which is well know, is that type which is employed with conventional bumper jacks that are used with automotive vehicles.

The conventional bumper jack, however, constitutes a rigid rod or bar on which is slidable a member containing the lever operated jacking mechanism and with the member having a hook or the like thereon for engagement with the automotive vehicle, such as beneath the vehicle bumper.

The jack according to the present invention, instead of using a hook, or the like, on the lever operated mechanism, mounts the mechanism referred to fixedly on the lower end of a tubular member which extends upwardly therefrom and at the upper end of which is mounted a bracket for securing to the underneath side of the vehicle. The lower end of the bar, which telescopically engages the lever-operated mechanism and the tubular member extending upwardly therefrom, has a ground-engaging means such as a pad, or wheel, on the bottom thereof. The jack structure when disposed vertically beneath the vehicle can be extended by actuating the lever-operated mechanism to press the ground-engaging means against the surface on which the vehicle rests so that the vehicle floor can be brought to a level condition and the vehicle stabilized in its parked condition.

The bracket at the upper end of the jack structure pivotally receives the upper end of the telescopically arranged members by means of a pivot which permits the jack structure to be swung between a vertical working position beneath the vehicle and a horizontal transport position beneath the vehicle. The ground-engaging means at the lower end of the telescopically arranged members, when in the form of a pad, is also preferably pivoted thereto so that it can be made of substantial area, but will not interfere with the jack structure when swung up close to the underneath side of the vehicle for transport, because the pad will swing downwardly and be suspended beneath the telescopically arranged members when in transport position.

An object of the present invention is the provision of a relatively simple and inexpensive but, nevertheless, highly effective stabilizer jack structure of the nature referred to.

A still further object of the present invention is the provision of a jack structure for the stabilization of vehicle, or trailers, which is convenient to use and which can be folded against the bottom of the vehicle for transport.

A still further object is the provision of the combination of a trailer vehicle and stabilizer jacks on the underside of the vehicle at the corners thereof, in which the jacks provide an inherently stable support for the vehicle when extended vertically therebeneath.

The foregoing objects, as well as still other objects and advantages, of the present invention will become more apparent upon reference to the following detailed specification taken in connection with the accompanying drawings in which:

FIG. 1 is a perspective view showing a trailer-type vehicle or camper having stabilizer jacks according to the present invention at the corners thereof;

FIG. 2 is a view, drawn at somewhat enlarged scale, and showing one of the jacks in working position beneath the corner of the vehicle;

FIG. 5 is a sectional view showing how the upper end of the jack structure could be pivotally connected to its supporting bracket to provide for stability of the jack structure in its working position; and FIG. 6 is a schematic view showing one manner in which the jack structure could be supported beneath the vehicle in transport position in a particularly firm and rattle free manner.

DETAILED DESCRIPTION

Figure 3:
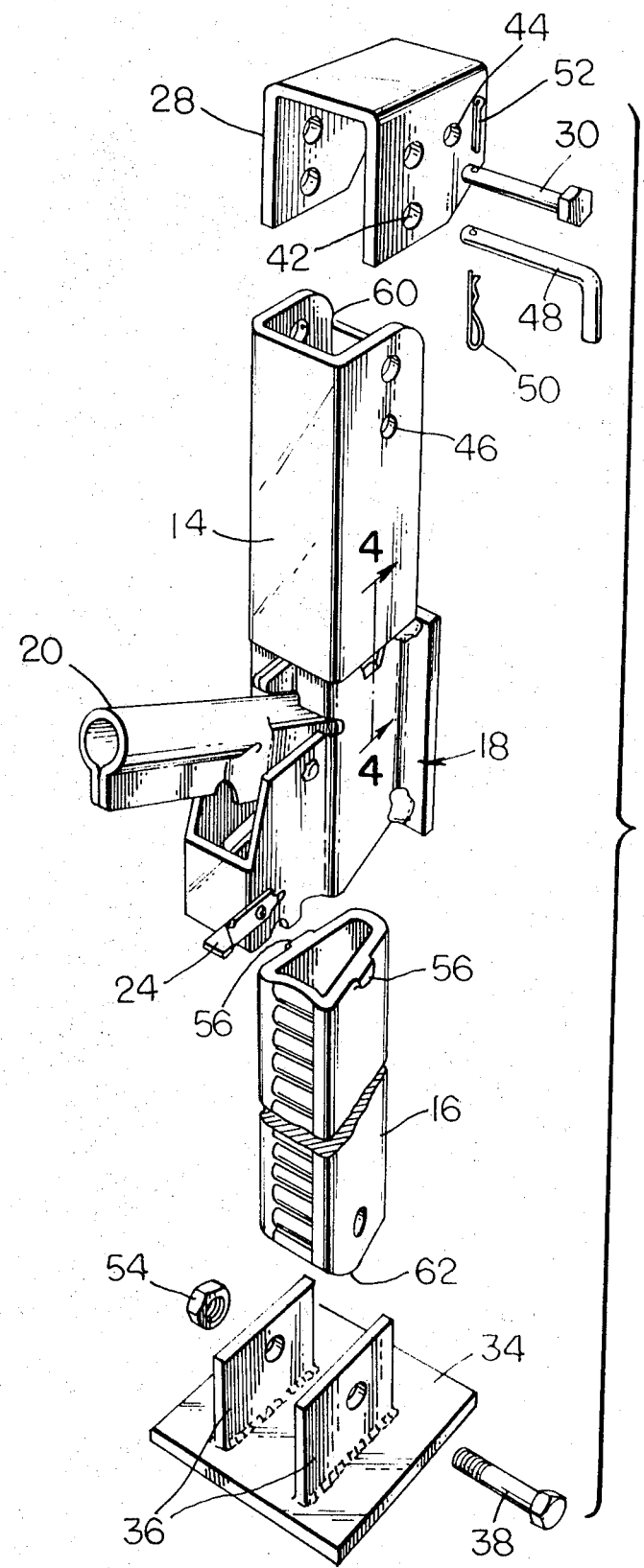
FIG. 3 is an exploded perspective view showing the principal components of a jack structure according to the present invention.
Figure 4:
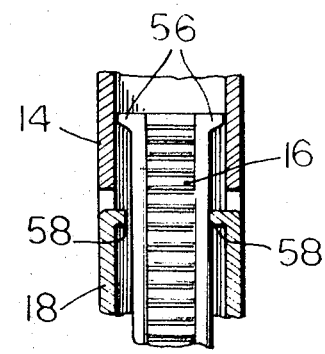
FIG. 4 is a fragmentary sectional view indicated by line IV—IV on FIG. 3, showing the provision of a stop arrangement for preventing the parts of the jack structure form being extended beyond a certain maximum amount.

Referring to the drawings somewhat more in detail, in FIG. 1, a trailer-type vehicle, or camper, is indicated at 10 and beneath each of the four corners thereof is an extensible stabilizer jack structure, generally indicated at 12.

Reference to FIGS. 2 and 3 will show that the jack structure 12 comprises an upper tubular member 14 and a lower barlike member 16 adapted to telescope into member 14. On the lower end of member 14 is fixed a lever operated mechanism, generally indicated at 18 and, as mentioned above, consisting of a bumper jack-type actuating device. Such a device comprises a lever 20 pivoted to the mechanism at 22 and oscillatable in a vertical plane to cause the members to extend longitudinally, or to permit the members to collapse.

A selector lever 24, of a conventional type, determines whether oscillation of lever 20 will drive members 14 and 16 in an extending direction, or permit the members to collapse. Conventionally, lever 20 has a socket for receiving the lever extension 26 to permit manual operation of the mechanism 18.

At the upper end of member 14, there is provided an inverted U-shaped bracket 28 pivoted to the upper end of member 14 as by pivot bolt 30. The upper closed end of bracket 28 is secured to the underside of the bottom frame member 32 of vehicle 10 in any suitable manner such as by welding or bolting. Other forms of support bracket can, of course, be employed.

At the lower end of member 16 there is provided a planar ground-engaging pad 34 of substantial area which has integral therewith bracket means 36, by means of which the ground-engaging pad is pivotally connected to the lower end of member 16 as by pivot bolt 38. The pivots provided by pivot bolts 30 and 38 permit the jack structure to be swung upwardly beneath the bottom of the vehicle 10 into a transport position as indicated by the dot-dash outline 40 in FIG. 2. The jack structure, thus, has a folded up transport position and a vertically downwardly extending working position beneath vehicle 10.

The bracket 28 is provided with a pair of holes 42 and 44, which are adapted or respective registration with a hole 46 provided in member 14 near the upper end thereof when the jack structure is in its two operative positions. A pin 48 is adapted for being inserted in the holes thereby to fix the jack structure to the bracket 28 in each of the aforesaid operative positions. An easily withdrawn spring-type lock element 50 can be employed in connection with pin 48 to prevent pin 48 from being accidentally dislodged form assembled position with bracket 28 and member 14. As will be seen in FIG. 3, pivot bolt 30 may also be in the form of a pin having a head on one end and adapted for being fixed in place by a conventional cotter pin 52 in the other end thereof.

The pivot bolt 38 connecting bracket means 36 of the ground-engaging pad 34 with the lower end of member 16 may be of the same type as pivot bolt 30 or it may be, as shown, threaded so as to receive a nut 54.

FIG. 3 will also show that lower barlike member 16 has lateral projections 56 thereon at the top and these constitute stop elements to prevent the extension of member 16 outwardly from member 14 beyond a predetermined amount. To this end, the upper end of mechanism 18, or the lower end of tubular member 14 is provided with cooperating stop elements 58 disposed in the path of projections 56 on member 16 on the underneath side thereof. Stop elements 58 may be in the form of tabs turned in form the lower end of tubular member 14, or the upper end of the frame of mechanism 18.

In the arrangement shown in FIGS. 2 and 3, the corner 60 at the one side of the upper end of member 14 and the corner 62 at the lower end, on the opposite side of member 16, may be rounded off to permit the member 14 to turn in its bracket 28 and to permit ground-engaging pad 34 and its bracket means 36 to turn on the lower end of member 16 when the jack structure is swung between its working and transport positions.

As will be seen in FIG. 2, member 14 takes a solid bearing at the region marked 64 on its bracket 28 when in working position and, similarly, lower member 16 and ground-engaging pad 34 have a firm bearing in the region marked 66 when the jack is in working position. By the provision of the stopped position of member 14 on bracket 28, and the stopped position of ground -engaging pad 34 on the lower end of member 16, the two oppositely facing jacks, at the opposite ends of the vehicle, on each side provide a basically stable support for the vehicle so that once the jacks are in working position and extended into firm bearing with the surface beneath the vehicle, the vehicle is held against longitudinal movement.

As will be seen, the jacks are supported for swinging movement in the fore-and-aft direction of the vehicle and do not swing thereon laterally and the jack structure thus provides for lateral stability as well as longitudinal stability.

FIG. 5 shows how the stability of the jack structure can be enhanced when the jack is in working position. In FIG. 5, reference numeral 70 indicates the bracket which is secured to the underside of the trailer, and reference numeral 72 indicates the upper one of the telescopically arranged members of the jack. Pivot bolt 74 connecting member 72 with bracket 70 is located substantially nearer one side of member 70 than the other and this permits a fairly small region of the corner adjacent bolt 74 to be rounded off as indicated in 76, so that the major portion of the upper end of member 72 takes a solid bearing on bracket 70 when the jack is in working position. With the arrangement shown in FIG. 5, it is preferable for the lockpin, indicated at 78, to be in the position in which it is shown in FIG. 5 while the jack structure is in working position and engaged with hole 80 of bracket 70 when the jack is in transport position.

FIG. 6, rather schematically, illustrates the manner in which the jack structure could be and spring in transport position beneath the vehicle 10 in extremely firm and substantially rattle free manner. Under the vehicle, or on the side of the jack structure, is a resilient bumper member 82, which may be of a rubberlike material, but which could also be a metal spring, if desired. When the jack is swung up to transport position, bumper 82 is compressed between the jack and the bottom of the vehicle. The jack structure may be held in firm engagement with resilient bumper 82 by a spring 84 connected to its upper end to the underside of vehicle 10, as by the loop member 86, and having its lower end formed to engage a hole 88 provided in the ground engaging pad 90. The lower end of the spring may comprise finger loop 92 for manipulation of the spring into and out of engagement with the jack structure.

With the arrangement of FIG. 6, the jack is swung to its transport position and spring 84 is engaged with pad 90 and this will hold the entire jack structure tightly against the bottom of the vehicle and prevent rattling and vibration thereof. The tension on spring 84 can be varied, if desired, by extending the jack somewhat after the spring 84 has been engaged with hole 88 in pad 90.

The arrangement according to the present invention is relatively inexpensive and is simple to operate and is conveniently arranged on the vehicle so that it becomes a simple matter to park and unpark the vehicle when it is provided with stabilizer jacks of the nature disclosed herein.

THe jacks illustrated are the type that support the vehicle stationarily but should it be desired for the jacks, at the hitch end of the vehicle, for example, to engage the surface beneath the vehicle in a rolling manner, the lower ends of those jacks could be provided with rollers or caster wheels, if desired.

Modifications can be made in the present invention within the scope of the appended claims.

What is claimed is:

1. A jack structure for use with a trailer-type vehicle for stabilization and leveling of the vehicle when parked;
    a. said jack structure comprising telescopically engaged end members and lever-operated mechanism interconnecting said members for selectively adjusting the degree of telescopic engagement thereof,
    b. an inverted U-shaped bracket pivoted to one end of said telescopically engaged members and adapted for being fixed to the underside of the vehicle at the side of the vehicle,
    c. said bracket having means for fixing said members in place in at least the working position thereof includes holes therein and said one end of said member which align in at least said working position of said members, and pin means for insertion into said holes when aligned to fix said members in place in said bracket,
    d. said one end member having a corner rounded off so that the major portion of the upper end of said one end member provides a solid bearing with said bracket in the working position thereof, and
    e. a ground-engaging pad member pivotally mounted on the lower end of the other said end member so as to be disposed on the underside of said members when the members are in transport position, said other end member having its end portion abutting said pad to provide a solid bearing therebetween when the members and pad are in working position to prevent pivotal movement between the pad and said other end member.

2. A jack structure according to claim 1 in which the said mechanism for the jack structure projects therefrom on that side of the jack structure which faces downwardly when the jack structure is in transport position and outwardly from the vehicle when the jack structure is in the working position.

3. A jack structure according to claim 2 wherein the said members pivot on the U-shaped bracket toward the longitudinal center of the vehicle when moved to the transport position, a resilient element carried on the jack mechanism an underside of the vehicle which is compressed therebetween when the said members are swung to transport position beneath the vehicle, and spring means detachably connected between said members, and said vehicle when said members are in transport position for holding said members tightly against said resilient element.

4. A jack structure according to claim 1 wherein the pad member is mounted on an axis parallel to the axis of the pivotal connection of the said one end of said members with said U-shaped bracket whereby said end members are perpendicular to the vehicle when said end members are in working position, and spring means detachably connected between said vehicle and said pad along the edge of the pad nearest said bracket to hold the entire jack structure in a vibration free manner when in transport position.

PO-1050
(5/69)

UNITED STATES PATENT OFFICE
CERTIFICATE OF CORRECTION

Patent No. 3,614,064      Dated October 19, 1971

Inventor(s) Winton J. Bennett

It is certified that error appears in the above-identified patent and that said Letters Patent are hereby corrected as shown below:

Col. 2, line 68, "or" should be --- for ---.

Col. 3, line 17, "form", second occurrence, should be --- from ---.

Col. 3, line 60, "and spring" should be --- supported ---.

Col. 4, line 57 (Claim 3), "an" should be --- and ---.

Signed and sealed this 9th day of May 1972.

(SEAL)
Attest:

EDWARD M. FLETCHER, JR.
Attesting Officer

ROBERT GOTTSCHALK
Commissioner of Patents